(12) United States Patent
Goldman et al.

(10) Patent No.: US 10,480,204 B2
(45) Date of Patent: Nov. 19, 2019

(54) CHEMICAL INJECTOR FOR USE WITH A POOL OR SPA SYSTEM AND RELATED METHODS

(71) Applicant: Zodiac Pool Systems LLC, Vista, CA (US)

(72) Inventors: David Goldman, Carlsbad, CA (US); Hwa Leung Heng, Vista, CA (US)

(73) Assignee: ZODIAC POOL SYSTEMS LLC, Carlsbad, CA (US)

(*) Notice: Subject to any disclaimer, the term of this patent is extended or adjusted under 35 U.S.C. 154(b) by 0 days.

(21) Appl. No.: 15/749,753

(22) PCT Filed: Aug. 5, 2016

(86) PCT No.: PCT/US2016/045697
§ 371 (c)(1),
(2) Date: Feb. 1, 2018

(87) PCT Pub. No.: WO2017/024199
PCT Pub. Date: Feb. 9, 2017

(65) Prior Publication Data
US 2018/0223552 A1 Aug. 9, 2018
US 2019/0153738 A2 May 23, 2019

Related U.S. Application Data

(60) Provisional application No. 62/201,265, filed on Aug. 5, 2015.

(51) Int. Cl.
*E04H 4/12* (2006.01)
*B01F 5/04* (2006.01)
(Continued)

(52) U.S. Cl.
CPC ......... *E04H 4/1281* (2013.01); *B01F 5/0496* (2013.01); *C02F 1/686* (2013.01);
(Continued)

(58) Field of Classification Search
CPC ... E04H 4/1281; E04H 4/1245; C02F 11/686; C02F 2201/006; C02F 2103/42; B01F 5/0496
(Continued)

(56) References Cited

U.S. PATENT DOCUMENTS 5,251,656 A * 10/1993 Sexton, Sr. ............ B01F 1/0027
137/1
5,310,087 A * 5/1994 Fulton ...................... G05D 9/12
222/144.5
(Continued)

FOREIGN PATENT DOCUMENTS

| WO | 2005042398 | 5/2005 |
| WO | 2007084003 | 6/2007 |
| WO | 2017024199 | 2/2017 |

OTHER PUBLICATIONS

International Application No. PCT/US2016/045697, "International Preliminary Report on Patentability", dated Feb. 15, 2018, 10 pages.
(Continued)

*Primary Examiner* — Fred Prince
(74) *Attorney, Agent, or Firm* — Kilpatrick Townsend & Stockton LLP; Dean W. Russell

(57) ABSTRACT

A chemical injector for use with a pool system can include an assembly having a disposable chemical container (214) and a pump (106,216). The disposable chemical container can fluidly seal a chemical in an inner volume of the disposable chemical container. The pump can be coupled to the disposable chemical container for injecting the chemical into the fluid flow of the pool system.

17 Claims, 5 Drawing Sheets

(51) Int. Cl.
*C02F 1/68* (2006.01)
*C02F 103/42* (2006.01)

(52) U.S. Cl.
CPC .... *C02F 2103/42* (2013.01); *C02F 2201/006* (2013.01); *E04H 4/1245* (2013.01)

(58) Field of Classification Search
USPC ..... 210/167.11, 206, 416.1, 416.2, 754, 756, 210/143, 749
See application file for complete search history.

(56) References Cited

U.S. PATENT DOCUMENTS 5,441,711 A * 8/1995 Drewery ............... B01F 1/0033
137/268
2005/0145550 A1 7/2005 Loyd et al.

OTHER PUBLICATIONS

International Application No. PCT/US2016/045697, "International Search Report and Written Opinion", dated Oct. 31, 2016, 15 pages.

* cited by examiner

CHEMICAL INJECTOR FOR USE WITH A POOL OR SPA SYSTEM AND RELATED METHODS

CROSS REFERENCE TO RELATED APPLICATION

This application is related to and claims priority benefits from U.S. Provisional Application Ser. No. 62/201,265 ("the '265 application"), filed on Aug. 5, 2015, entitled "Apparatus and Method for Dosing of Liquid Chemicals for use with a Swimming Pool or Other Body of Water." The '265 application is hereby incorporated in its entirety by this reference.

TECHNICAL FIELD

The present disclosure relates generally to injecting chemicals into a pool or spa system and, more particularly (although not necessarily exclusively), a chemical injector having a disposable chemical container for pool and spa systems.

BACKGROUND

Liquid chemicals applied to pools, spas, water features and other bodies of waters can be corrosive and can burn skin or eyes or cause other serious bodily injury or damage to property. A user can either transfer chemicals (e.g., muriatic acid) from one container to another, or insert a straw-like device into the bottle containing the chemical after removing the top. Given the hazardous nature of the chemicals, users may be concerned about safety or property risks associated with the handling of such chemicals. Some pool owners may choose not to handle these chemicals themselves out of safety concerns and instead choose to hire a professional.

The equipment for dispensing chemicals into a pool system can include an arrangement of devices including expensive and complex pumping mechanisms, such as peristaltic or diaphragm pumps that can be prone to failure. If components of the pump fail, damage of property and harm to a user may occur, as spilled chemicals can quickly damage concrete and metal and can pose safety hazards to persons or pets.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain aspects of the present disclosure, an assembly for a pool or spa system can include a disposable chemical container and a pump. The disposable chemical container can fluidly seal a chemical in an inner volume of the disposable chemical container. The pump can couple to the disposable chemical container for injecting the chemical into a fluid flow of the pool or spa system.

In additional or alternative aspects, the chemical can be sealed in the inner volume of the disposable chemical container prior to the pump coupling to the pool system or the spa system.

In additional or alternative aspects, the assembly can further include a sensor, a processing device, and a communication circuit. The sensor can measure an amount of the chemical in the disposable chemical container, the processing device can communicatively couple to the sensor for determining the amount is below a threshold, and the communication circuit can communicatively couple to the processing device for requesting a replacement assembly when the amount is below the threshold.

In additional or alternative aspects, the assembly can further include a processing device and a sensor. The processing device can communicatively couple to the pump for activating the pump to inject an amount of the chemical based on a characteristic of the fluid flow, and the sensor can communicatively couple to the processing device for measuring the characteristic of the fluid flow.

In additional or alternative aspects, the sensor can be for measuring an acidity of fluid in the fluid flow. The chemical can be an acid for adjusting the acidity of the fluid. The pump can be calibrated for dispensing the acid in a standardized dose to allow treatment of the fluid.

In additional or alternative aspects, the assembly can include a processing device and a communication circuit. The processing device can be communicatively coupled to the pump for activating the pump to inject an amount of the chemical based on an instruction from a user, and the communication circuit can be communicatively coupled to the processing device for receiving the instruction from the user.

According to certain aspects of the present disclosure, a system can include a tubing and a chemical injector. The tubing can be coupled to a pool or a spa for allowing a fluid in the pool or the spa to flow therethrough, and the chemical injector can be coupled to the tubing and include a pump and a disposable chemical container. The pump can be for injecting a chemical into the tubing. The disposable chemical container can be coupled to the pump. The disposable chemical container can include a seal for retaining the chemical in an inner volume of the disposable chemical container. The seal can open in response to the disposable chemical container being coupled to the pump to allow the chemical to be injected by the pump into the tubing.

In additional or alternative aspects, the chemical can be sealed in the inner volume of the disposable chemical container prior to the disposable chemical container being coupled to the pump.

In additional or alternative aspects, the seal of the disposable chemical container can be a valve for coupling to the pump and for opening to create a passageway between the inner volume of the disposable chemical container and the pump.

In additional or alternative aspects, the seal of the disposable chemical container can be opened by a member of the pump piercing the seal to create a passageway between the inner volume of the disposable chemical container and the pump.

In additional or alternative aspects, the pump can be a first pump. The system can further include a second pump, a filter, and a check valve. The second pump can be coupled to the tubing for pumping the fluid through the tubing. The filter can be coupled to the tubing for filtering the fluid. The check valve can be coupled to the tubing for limiting a direction of a flow path in the tubing.

According to certain aspects of the present disclosure, a method can include providing a chemical for treating a fluid in a pool system or a spa system. The method can further include providing a disposable chemical container having an inner volume for housing the chemical. The method can further include providing a seal for sealing the chemical in the inner volume of the disposable chemical container. The seal can open in response to the disposable chemical container being positioned in a chemical injector coupled to the pool system or the spa system.

In additional or alternative aspects, the seal can be an integrated pump for injecting the chemical into the pool system or the spa system.

In additional or alternative aspects, the method can further include providing a sensor for monitoring an amount of the chemical in the inner area of the disposable chemical container. The method can further include providing a processing device for communicatively coupling to the sensor to determine the amount is below a threshold. The method can further include providing a communication circuit for communicatively coupling to the processing device for requesting a replacement disposable chemical container when the amount drops below the threshold.

In additional or alternative aspects, the method can further include providing a tubing for coupling to the pool system or the spa system to allow fluid from the pool system or the spa system to flow therethrough. The method can further include providing an injection pump for coupling to the tubing to form the chemical injector that can be coupled to the disposable chemical container.

In additional or alternative aspects, the method can further include providing a second pump for coupling to the tubing to pump the fluid through the tubing. The method can further include providing a filter for coupling to the tubing to filter the fluid, and providing a check valve for coupling to the tubing to limit a direction of a flow path in the tubing.

DETAILED DESCRIPTION

Figure 1:
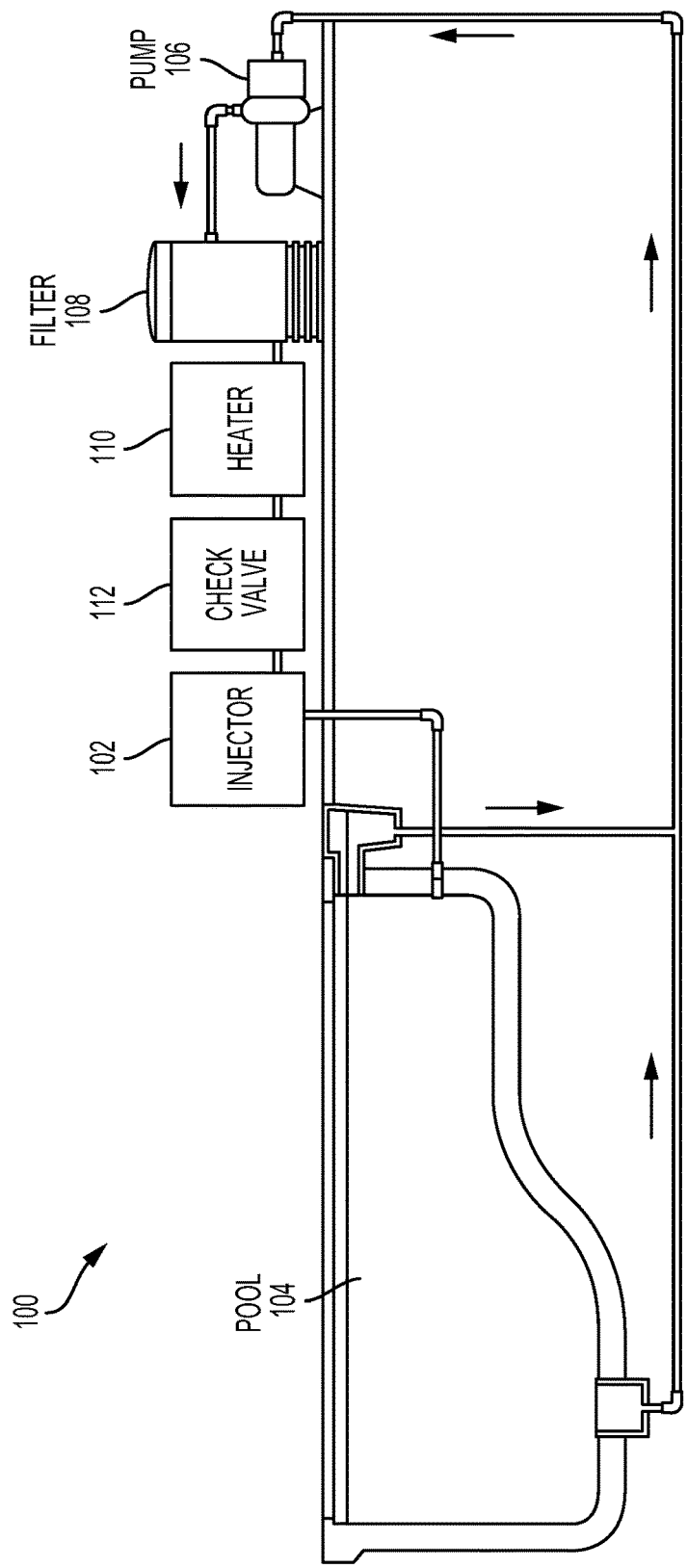
FIG. 1 is a schematic of an example of a pool or spa system with a chemical injector having a disposable chemical container according to one aspect of the present disclosure.

Certain aspects of the present disclosure relate to a chemical injector for use with a pool system. The phrase "pool system" used herein includes any treated body of water including but not limited to a pool, a spa system or a water feature (e.g., a fountain or waterfall). In some cases, the chemical injector includes a disposable chemical container for housing a chemical that can be used to treat a fluid in the pool system. The disposable chemical container is configured to prevent exposure of the chemical to users of the chemical injector by allowing chemicals to be provided to the chemical injector while in a fluidly sealed packaging. In some cases, the disposable chemical container is configured to be replaceable rather than refillable such that the chemical can be transported, installed in the chemical injector, and dispersed into the fluid without transferring the chemical between containers.

In some aspects, a disposable chemical container includes a valve for fluidly coupling the disposable chemical container to a chemical injector. The valve can act as a seal until the valve is coupled to a receiving component in a chemical injector. In some examples, the valve can be fluidly coupled to an injection pump of a chemical injector such that the injection pump creates a flow path for the chemical into a flow of fluids in a pool system. In additional or alternative aspects, the disposable chemical container can include a portion that is penetrable by a member of the chemical injector for fluidly coupling the disposable chemical container with the chemical injector.

Instead of or in addition to the injection pump, the disposable chemical container can include an integrated pump. The disposable chemical container can be positioned in the chemical injector such that the integrated pump is fluidly coupled to a flow path of a fluid in a pool system. The integrated pump can be designed to operate long enough to dispense all of the chemical from the disposable chemical container. The use of an integrated pump can reduce maintenance costs of a chemical injector.

In some aspects, the chemical injector includes one or more nozzles. For example a face or end of the disposable chemical container can include one or more nozzles. The one or more nozzles can be designed to minimize risk of the chemical leaking out of the nozzle.

In some examples, the chemical injector includes a housing for shielding a user from the disposable chemical container as the chemical flows through the one or more nozzles and/or the pump.

The disposable chemical container of the chemical injector can have any shape with an inner volume for housing a chemical. In some examples, the disposable chemical container is rigid so that the shape of the disposable chemical container is maintained as the chemical is removed from the inner volume. In other examples, the disposable chemical container is flexible, so that the shape contracts as the chemical is removed from the inner volume. The disposable chemical container can be made of any suitable material, including but not limited to aluminum, stainless steel, other metallic materials, composite materials, or plastics (e.g., polycarbonate and polypropylene). In some examples, the disposable chemical container can be biodegradable.

In some aspects, the disposable chemical container can also include or be communicatively coupled to a sensor, a processing device, and/or a communication circuit. The sensor can be any suitable sensor that measures a status (e.g., full, partially full or empty) of the disposable chemical container. In some examples, the sensor is a scale that measures the weight of the disposable chemical container. In additional or alternative examples, the sensor includes an emitter and a detector that can be placed on opposite sides of the disposable chemical container. The emitter can emit a wave (e.g., light or sound) through the disposable chemical container to the detector. The amount, quality, or speed of the signal received by the detector can be used to determine the status of the disposable chemical container. For example, a light source can be positioned at a set height of the disposable chemical container to transmit a beam of light through the disposable chemical container to a photodiode. The fluid can block the beam from reaching the photodiode, so detecting the light beam by the photodiode can indicate the chemical is below the set height. In additional or alternative aspects, a sensor can measure a characteristic (e.g., pH) of a fluid circulating in a pool system.

The processing device can receive information from the sensor and determine when to dispense the chemical from the disposable chemical container into the fluid flow and/or how much chemical to dispense into the fluid flow. The processing device can also determine when a replacement for the disposable chemical container is needed. A communication circuit can be included for communicating with an external network or device. The communication circuit can receive instructions from the processing device to activate the chemical injector. The communication circuit can also transmit a request for a replacement for the disposable chemical container in response to a determination from the processing device. In some examples, the communication circuit can include (or be communicatively coupleable) to an antenna for communicating wirelessly.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure. The phrase "disposable" can be used herein to describe a component that can be removed, discarded, and replaced.

FIG. 1 is a schematic view of a pool system 100 with a chemical injector 102 having a disposable chemical container. The pool system 100 also includes a pool 104, a pump 106, a filter 108, an optional heater 110, and a check valve 112. The pool 104 can include one or more outlets and an inlet fluidly coupled to the pump 106 for creating a flow of fluid from the outlets to the inlet. The filter 108 is positioned in a flow path of the flow for filtering the fluid. The filter 108 can include a physical screen for removing particulate (e.g., branches, sand, etc.) and/or a chemical or biological screen for removing particulate from the flow. The heater 110 can be positioned in the flow path for adjusting a temperature of the fluid in the flow. The check valve 112 can be positioned in the flow path for limiting the direction of the flow. The injector 102 can be positioned in the flow path to dispense a chemical into the fluid for treating the fluid. For example, the injector 102 can dispense acid into a fluid to lower a pH of the fluid. The fluid can flow from the injector 102 through the inlet and back into pool 104.

In some aspects, the injector 102 includes an injection pump for fluidly coupling to a disposable chemical container and pumping a chemical from the disposable chemical container into the flow. The disposable chemical container can be replaceable rather than refillable for preventing users and an environment of the pool system from exposure to the chemicals. In some examples, the disposable chemical container is a pre-packaged and fluidly sealed vessel that can be transported and positioned in the chemical injector without transferring the chemical between containers. The disposable chemical container can have a first state in which the chemical is fluidly sealed in an inner volume and a second state in which a sealed flow path forms between the inner volume and the injection pump.

The injector 102 can also include one or more sensors, a processing device, or a communication circuit. The one or more sensors can measure one or more characteristics of the fluid flow and/or the disposable chemical container. The processing device can be communicatively coupled to the one or more sensors for analyzing the measurements taken by the one or more sensors. The communication circuit can communicate with external devices to provide the injector 102 with instructions or to request a replacement of the disposable chemical container.

Although FIG. 1 depicts the injector 102 as fluidly coupled to a pool system 100, the injector 102 can be fluidly coupled to any fluid system including a spa system or a water feature. A pool system can include more than one injector and the components of the pool system can vary from what is illustrated in FIG. 1 and/or can be positioned in a different order along the flow path. In some examples, an injector can be positioned to dispense a chemical directly into a pool.

Figure 2:
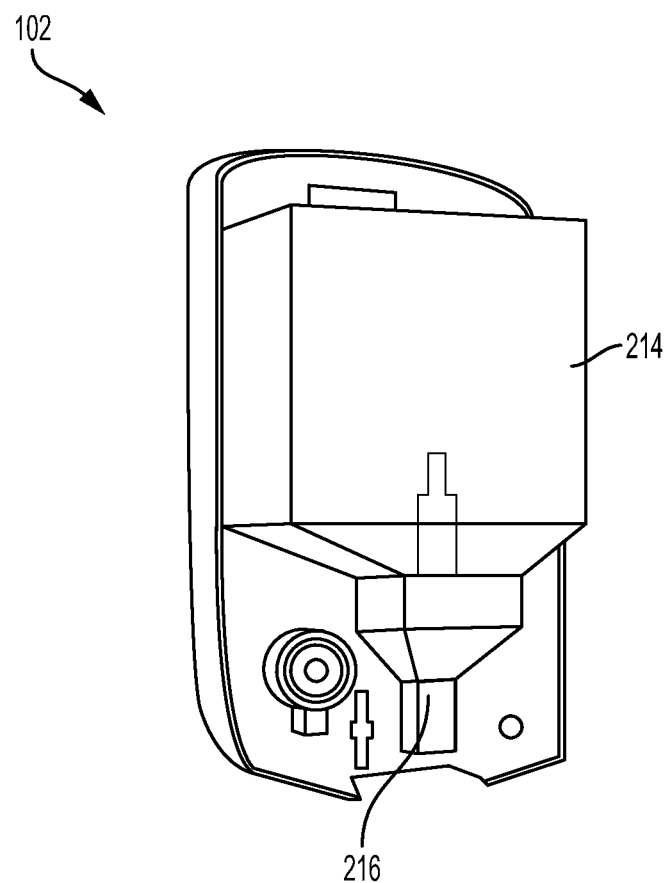
FIG. 2 is a perspective view of an example of a chemical injector having a disposable chemical container according to one aspect of the present disclosure.

FIG. 2 is a perspective view of an example of the chemical injector 102 from FIG. 1. The chemical injector 102 houses a disposable chemical container 214 having an integrated pump 216. The disposable chemical container 214 is positioned in a body of the chemical injector 102 for fluidly coupling the disposable chemical container 214 with a flow of fluid in the pool system. The disposable chemical container 214 includes an inner volume housing a chemical. The integrated pump 216 is coupled to the disposable chemical container 214 for pumping a portion of the chemical into the flow.

The disposable chemical container 214 can be any size and include any number of chemical doses. For example, the disposable chemical container 214 can include an amount of the chemical for a week or other predetermined period of time of dosing a pool system. After a week or other predetermined period, the disposable chemical container 214 can be removed from the chemical injector 102 and a replacement disposable chemical container can be installed in the chemical injector 102. The integrated pump 216 can be designed to operate for a predetermined amount of time, such as, long enough to dispense all of the doses, although it need not be so designed. In some cases, the integrated pump 216 can be designed to have a shorter operational lifetime than an injection pump and can reduce maintenance costs of the chemical injector 102.

The disposable chemical container 214 can have any shape with an inner volume for housing the chemical. In some examples, the disposable chemical container 214 is rigid so that the shape of the disposable chemical container 214 is maintained as the chemical is dispensed from the inner volume. In other cases, the disposable chemical container 214 is flexible, so that the shape contracts as the chemical is dispensed from the inner volume. The disposable chemical container 214 can be made of any suitable material, including but not limited to aluminum, stainless steel, other metallic materials, composite materials, or plastics (e.g., polycarbonate and polypropylene). In some examples, the disposable chemical container 214 is biodegradable.

As described above, the injector 102 can also include one or more sensors for measuring a status of the disposable chemical container 214 or a status of the fluid in the flow. The injector 102 can further include a processing device for determining when the chemical should be dispersed into the flow and how much chemical should be dispersed into the flow. The processing device can also determine when the disposable chemical container 214 should be replaced by detecting the amount of chemical in the inner volume of the disposable chemical container 214 is below a threshold amount. The injector 102 can also include a communication circuit for receiving instructions (e.g., a request to dispense a set amount of the chemical into the flow) from a transceiver external to the injector 102. The communication circuit can also transmit a request for a replacement chemical container based on a determination by the processing device. The injector 102 can also include a housing for shielding a user from the disposable chemical container 214 as the chemical is dispersed by the integrated pump 216.

Although FIG. 2 depicts integrated pump 216, the chemical injector could additionally or alternatively include an injection pump for fluidly coupling to the disposable chemical container and dispensing a chemical from the disposable chemical container. In some examples, the disposable chemical container includes a valve for fluidly coupling the disposable chemical container to the injection pump. The valve can keep the chemical sealed in the disposable chemical container until the valve is coupled to the injection pump. The chemical injector can also additionally or alternatively include a penetrating member for piercing a seal in the disposable chemical container to create a flow path between the inner volume of the disposable chemical container and the injection pump of the chemical injector.

In some aspects, the chemical injector or disposable chemical container includes one or more nozzles for allowing the chemical to be dispensed therethrough. For example, a face of the disposable chemical container can include the one or more nozzles. The one or more nozzles can be designed to minimize the risk of the chemical leaking out of the nozzle. In some aspects, the chemical injector can have one or more integrated pumps, one or more injection pumps, and/or one or more nozzles for dispensing the chemical from the disposable chemical container.

Figure 3:
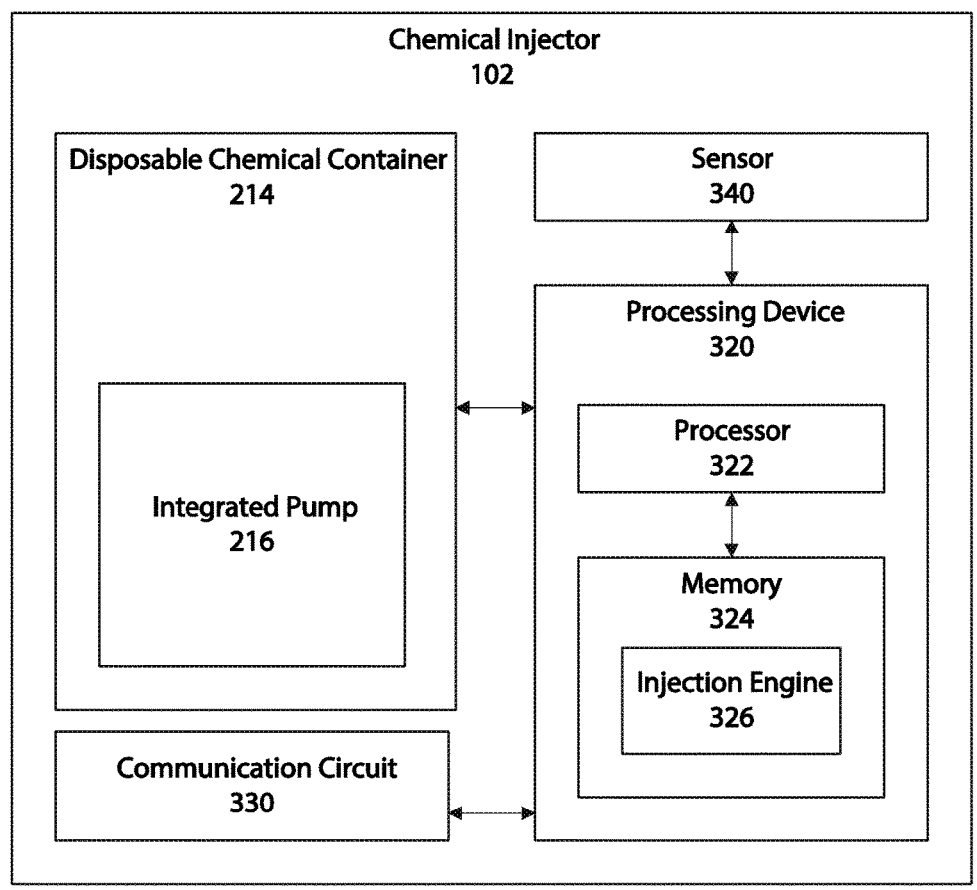
FIG. 3 is a block diagram of an example of a chemical injector having a disposable chemical container according to one aspect of the present disclosure.

FIG. 3 is a block diagram of the chemical injector 102 from FIG. 2. As discussed above, the chemical injector 102 can be positioned in a fluid flow of a pool system for dispensing a chemical (e.g., an acid) into the fluid flow to treat the fluid. The chemical injector can include the disposable chemical container 214, a processing device 320, a communication circuit 330, and a sensor 340.

The disposable chemical container 214 houses the chemical and can include the integrated pump 216 (or injection pump) for dispensing the chemical. The disposable chemical container 214 prevents exposure of the chemical to users of the chemical injector 102 by allowing the chemical to be provided to the chemical injector 102 while in a fluidly sealed packaging. The disposable chemical container 214 can be replaceable rather than refillable such that the chemical can be transported, installed in the chemical injector 102, and dispersed into the fluid flow without the chemical being transferred between containers.

The disposable chemical container 214 can be positioned in the chemical injector 102 such that the integrated pump 216 is fluidly coupled to the flow path of the fluid in the pool system. The integrated pump 216 can have a known dispense rate such that the integrated pump 216 can be activated for a predetermined period of time and dispense a predetermined amount of the chemical into the flow. In some cases, the integrated pump 216 can be designed to operate long enough to dispense all of the chemical from the disposable chemical container 214 and then be removed with the disposable chemical container 214.

The sensor 340 can be any suitable sensor for measuring a status (e.g., full, partially fully or empty) of the disposable chemical container 214. In some examples, the sensor 340 can be a scale that can measures the weight of the disposable chemical container 214. The weight of the disposable chemical container 214 can be monitored to detect leaks, determine an amount of the chemical being dispensed per activation of the integrated pump 216, and/or determine an amount of the chemical remaining in the disposable chemical container 214. In additional or alternative examples, the sensor 340 can include a light source and a photodiode for detecting if the amount of chemical in the disposable chemical container 214 is below a threshold amount. The sensor 340 can also be a pressure gauge for determining a pressure of the chemical in the disposable chemical container 214. In additional or alternative aspects, the sensor 340 (or in some cases, an additional sensor) can be positioned such that the sensor is exposed to the flow of fluid in the pool system and measures a characteristic (e.g., pH) of the fluid.

The processing device 320 can include any number of processors 322 for executing program code. Examples of the processing device 320 can include a microprocessor, an application-specific integrated circuit ("ASIC"), a field programmable gate array ("FPGA"), or other suitable processing device. In some aspects, the processing device 320 can be a dedicated processing device for analyzing a status of the disposable chemical container 214. In other aspects, the processing device 320 can be used for controlling a pumping system.

The processing device 320 can include (or be communicatively coupled with) a non-transitory computer-readable memory 324. The memory 324 can include one or more memory devices that can store program instructions. The program instructions can include, for example, an injection engine 326 that is executable by the processing device 320 to perform certain operations described herein.

In some examples, the operations can include measuring a characteristic (e.g., pH) of a fluid in the pool system to determine if a chemical (e.g., acid) should be injected into the flow of fluid. The operations can further or alternatively include communicating with the integrated pump 216 (or other pump) to instruct the integrated pump 216 (or other pump) to pump an amount of the chemical into the flow. The operations can further include monitoring the amount of the chemical remaining in the disposable chemical container 214. The operations can also include instructing the communication circuit 330 to transmit information about the amount of the chemical remaining or the characteristic of the fluid to another device.

Communication circuit 330 can be communicatively coupled to the processing device 320. The communication circuit 330 can include (or be communicatively coupled to) an antenna for wirelessly communicating with a transceiver external to the chemical injector 102. The communication circuit 330 can use any suitable communication technology including Bluetooth, Near Field Communication ("NFC"), or WiFi. The communication circuit 330 can also be communicatively coupled to a transceiver over a wireline. In some examples, the communication circuit 330 can communicate with a network of suppliers to request a replacement chemical container. In additional or alternative examples, the communication circuit 330 can receive instructions from a user to inject the chemical into the fluid.

In some aspects, the processing device 320 can be communicatively coupled to a display device for instructing the display device to display information about the pool system. The information can include a status of the disposable chemical container 214 or a status of the fluid in the pool system.

Although FIG. 3 depicts chemical injector 102 as including a disposable chemical container 214 having an integrated pump 216, the chemical injector could include a separate injection pump as described above. In these cases, the disposable chemical container can be a fully sealed container with an opening that is formed when the disposable chemical container is fluidly coupled to the separate injection pump. In some examples, coupling the disposable chemical container to a separate injection pump can penetrate a portion of the disposable chemical container to create a flow path between a disposable chemical container and the injection pump. In some cases, the disposable chemical container includes a valve for physically coupling to the injection pump and creating flow path for the chemical in an inner volume of the disposable chemical container to flow into the injection pump. The container can be designed so a seal forms between the separate injection pump and the disposable chemical container such that the chemical is retained in the container until removed by the separate injection pump.

In some aspects, the disposable chemical container can include a processing device, communication device, and a sensor as described above. Replacing the disposable chemical container can also include replacing one or more of the injection pump, the processing device, the communication device, and the sensor. In some aspects, the chemical injector includes more than one sensor.

Figure 4:
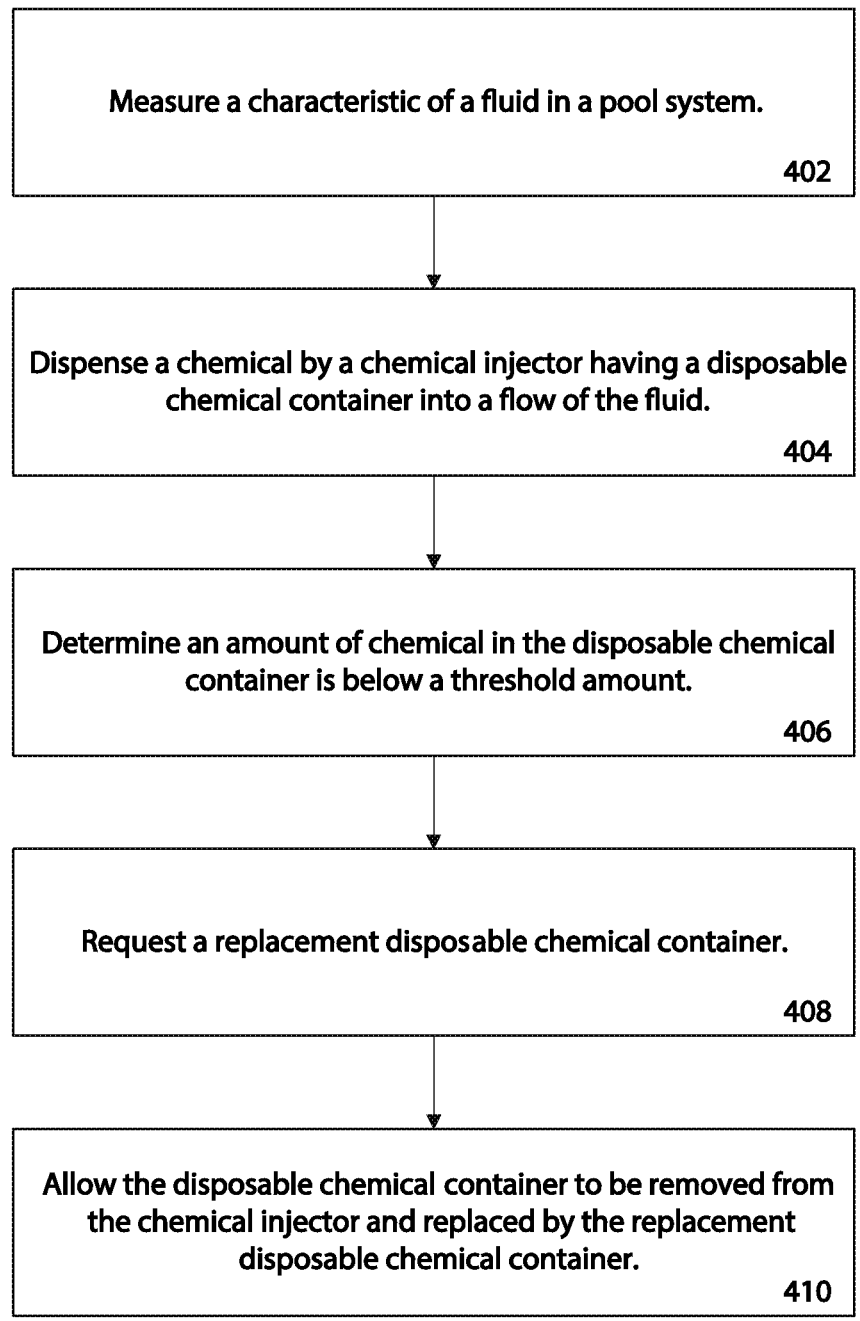
FIG. 4 is a flow chart of an example of a process for using a chemical injector with a disposable chemical container in a pool or spa system according to one aspect of the present disclosure.

FIG. 4 is a flow chart of an example of a process for using a chemical injector (such as chemical injector 102 described above) with a disposable chemical container (such as disposable chemical container 214) in a pool system. The disposable chemical container can allow for treatment of the pool system with a reduced risk of exposure of the chemical to users and the environment.

In block 402, a characteristic of a fluid in the pool system can be measured. The chemical injector can include a sensor for measuring a characteristic of the fluid in the pool system. For example, the sensor can measure the acidity, temperature, and/or composition of the fluid. The sensor can be communicatively coupled to a processing device for analyzing measurements taken by the sensor. The processing device can be included in the chemical injector or communicatively coupled to the sensor by a communication circuit.

In block 404, a chemical can be dispensed into the flow of the fluid by the chemical injector. As described above, the chemical injector can include an injection pump (or integrated pump) for fluidly coupling to a disposable chemical container. The disposable chemical container can be any size or shape and made of a material for housing the chemical. The disposable chemical container can be a pre-packaged and sealed container that can be transported and positioned in a chemical injector without unsealing. The disposable chemical container can have a valve for physically coupling to the injection pump and creating a flow path for the chemical in the inner volume of the disposable chemical container to flow into the injection pump. The injection pump can alternatively or additionally include a penetrating member for piercing a seal in a portion of the disposable chemical container to fluidly couple the injection pump with the disposable chemical container. As described above, instead of an injection pump, the chemical injector can include an integrated pump.

In some aspects, the processing device can instruct the injection (or other) pump to dispense a set amount of the chemical into the flow. In additional or alternative aspects, the injection pump can be communicatively attached to a timer for dispensing at a regular interval. The injection pump can also be communicatively coupled to the communication circuit for receiving instructions from a user to dispense the chemical into the flow.

In block 406, an amount of chemical in the disposable chemical container can be determined to be below a threshold amount. As described, the chemical injector can include any suitable sensor for monitoring a status of the disposable chemical container. The threshold amount can be based on an amount of the chemical estimated to be dispensed into the pool system during a time for a replacement disposable chemical container to be acquired.

In block 408, a replacement disposable chemical container can be requested. The request can be based on determining the disposable chemical container is empty or the chemical remaining in the disposable chemical container is below the threshold amount. The chemical injector can include a communication circuit for communicating with a network of suppliers to request the replacement chemical container. The communication circuit can include (or be communicatively coupled to) an antenna for wirelessly communicating the request to the network.

In block 410, the disposable chemical container can be allowed to be removed from the chemical injector and replaced by the replacement disposable chemical container. The disposable chemical container can fluidly seal in response to being removed from the chemical injector to prevent exposure of any remaining chemical to a user (e.g., by closure of the valve). The replacement disposable chemical container can be pre-packaged and sealed to allow for installation in the chemical injector without unsealing.

Figure 5:
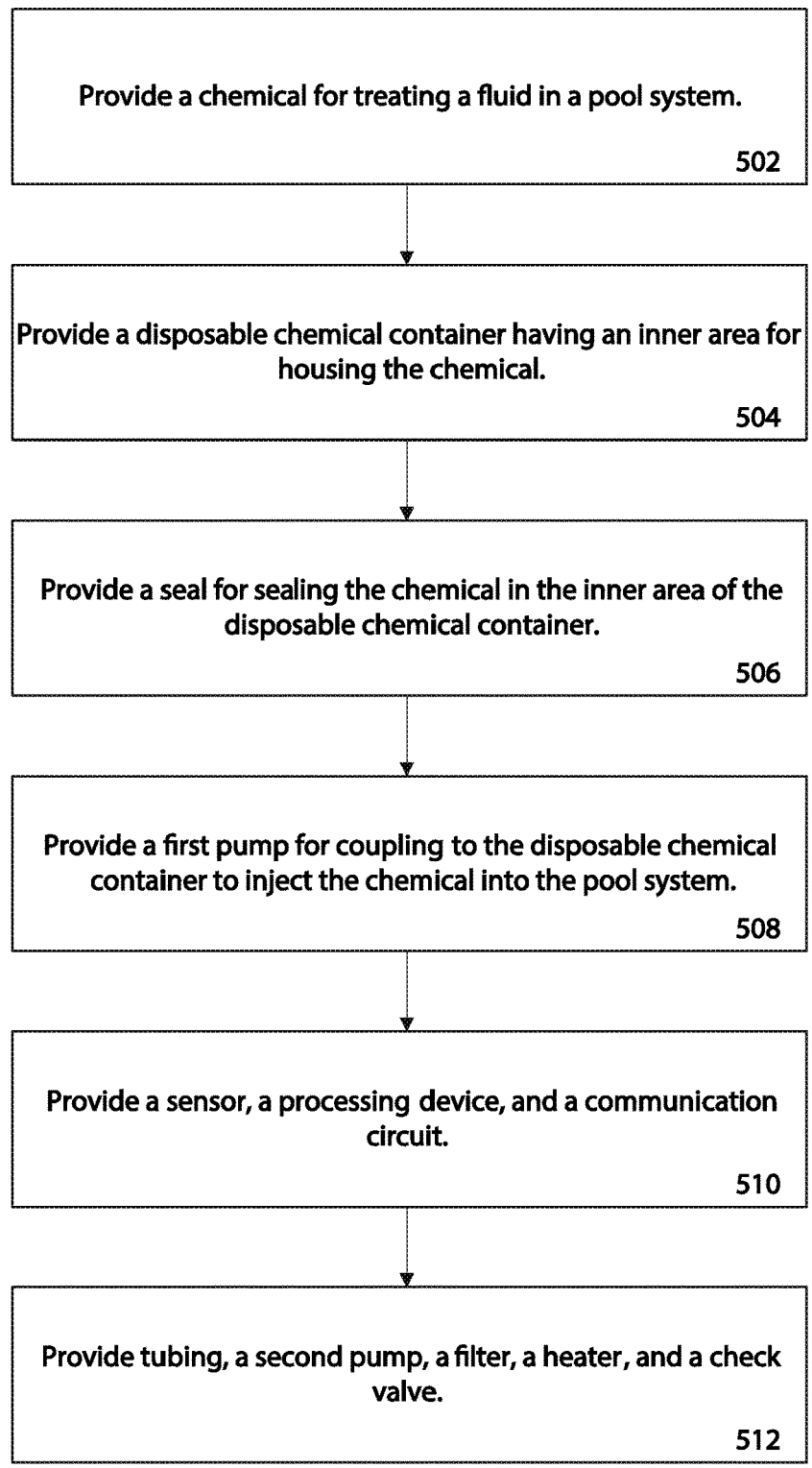
FIG. 5 is a flow chart of an example of a process for manufacturing a disposable chemical container for use with a pool or spa system according to one aspect of the present disclosure.

FIG. 5 is a flow chart of an example of a process for manufacturing a disposable chemical container usable with a pool system.

In block 502, a chemical is provided for treating a fluid in a pool system. The chemical can be an acid (e.g., muriatic acid) that is hazardous to users and the environment. The chemical can also include disinfectants such as chlorine. In block 504, a disposable chemical container (such as but not limited to disposable chemical container 214) is provided having an inner volume for housing the chemical. The disposable chemical container can be any size or shape and made of any material for housing the chemical. In block 506, a seal is provided for sealing the chemical in the inner volume of the disposable chemical container. The seal can open in response to the disposable chemical container being positioned in a chemical injector coupled to the pool system or upon coupling of the disposable chemical container with a pump. In block 508, a first pump is provided for coupling to the disposable chemical container to inject the chemical into the pool system. In some aspects, the first pump can be coupled to tubing to form the chemical injector.

In block 510, a sensor, a processing device, and a communication circuit are provided. The sensor is any suitable sensor for monitoring an amount of the chemical in the inner area of the disposable chemical container, as described above. The processing device can be communicatively coupled to the sensor to determine if the amount is below a threshold. The communication circuit can be communicatively coupled to the processing device to request a replacement disposable chemical container once the sensor senses the amount is below the threshold. In some aspects, an additional sensor can be provided for measuring a characteristic (e.g., pH) of the fluid in the pool system and the processing device can be for controlling an amount of the chemical the pump dispenses based on the characteristic.

In block 512, tubing, a second pump, a filter, an optional heater, and a check valve are provided. The tubing can be coupled to the pool system to allow fluid in the pool system to flow therethrough. The second pump can be coupled to the tubing to pump the fluid through the tubing. The filter can be coupled to the tubing to filter the fluid. The heater can be coupled to the tubing to heat the fluid. The check valve can be coupled to the tubing to limit the direction the fluid flows in the tubing.

In the following, further examples are described to facilitate the understanding of the invention:

Example #1

An assembly for a pool or spa system can include a disposable chemical container and a pump. The disposable chemical container can fluidly seal a chemical in an inner volume of the disposable chemical container. The pump can couple to the disposable chemical container for injecting the chemical into a flow of the pool or spa system.

Example #2

The assembly of Example #1 can feature the chemical being sealed in the inner volume of the disposable chemical container prior to the pump coupling to the pool system or the spa system.

Example #3

The assembly of any of the preceding examples can further include a sensor, a processing device, and a communication circuit. The sensor can measure an amount of the chemical in the disposable chemical container. The processing device can communicatively couple to the sensor to determine the amount is below a threshold. The communication circuit can communicatively couple to the processing device to request a replacement assembly when the amount is below the threshold.

Example #4

The assembly of any of the preceding examples can further include a processing device and a sensor. The processing device can communicatively couple to the pump for activating the pump to inject an amount of the chemical based on a characteristic of the fluid flow. The sensor can communicatively couple to the processing device for measuring the characteristic of the fluid flow.

Example #5

The assembly of Example #4 can feature the sensor being for measuring an acidity of fluid in the fluid flow. The chemical can be an acid for adjusting the acidity of the fluid. The pump can be calibrated for dispensing the acid in a standardized dose to allow treatment of the fluid.

Example #6

The assembly of any of the preceding examples can further include a processing device and a communication circuit. The processing device can be communicatively coupled to the pump for activating the pump to inject an amount of the chemical based on an instruction from a user. The communication circuit can communicatively couple to the processing device for receiving the instruction from the user.

Example #7

A system can include a tubing and a chemical injector. The tubing can be coupled to a pool or a spa for allowing a fluid in the pool or the spa to flow therethrough. The chemical injector can be coupled to the tubing and can include a pump and a disposable chemical container. The pump can inject a chemical into the tubing and the disposable chemical container can couple to the pump. The disposable chemical container can include a seal for retaining the chemical in an inner volume of the disposable chemical container. The seal can open in response to the disposable chemical container being coupled to the pump to allow the chemical to be injected by the pump into the tubing.

Example #8

The system of Example #7 can feature the chemical being sealed in the inner volume of the disposable chemical container prior to the disposable chemical container being coupled to the pump.

Example #9

The system of Example #8 can feature the seal of the disposable chemical container being a valve for coupling to the pump and opening to create a passageway between the inner volume of the disposable chemical container and the pump.

Example #10

The system of Example #8 or Example #9 can feature the seal of the disposable chemical container being opened by a member of the pump piercing the seal to create a passageway between the inner volume of the disposable chemical container and the pump.

Example #11

The system of any of Examples #7-#10 can further include a sensor, a processing device, and a communication circuit. The sensor can be for measuring an amount of the chemical in the disposable chemical container. The processing device can be communicatively coupled to the sensor for determining the amount is below a threshold. The communication circuit can be communicatively coupled to the processing device for requesting a replacement disposable chemical container when the amount is below the threshold.

Example #12

The system of any of Examples #7-#11 can further include a processing device and a sensor. The processing device can be communicatively coupled to the pump for activating the pump to inject an amount of the chemical based on a characteristic of the fluid flow. The sensor can be communicatively coupled to the processing device for measuring the characteristic of the fluid flow.

Example #13

The system of Example #12 can feature the sensor being for measuring an acidity of fluid in the fluid flow. The chemical can be an acid for adjusting the acidity of the fluid. The pump can be calibrated for dispensing the acid in a standardized dose to allow treatment of the fluid.

Example #14

The system of any of Examples #7-#13 can further include a processing device and a communication circuit. The processing device can be communicatively coupled to the pump for activating the pump to inject an amount of the chemical based on an instruction from a user. The communication circuit can be communicatively coupled to the processing device for receiving the instruction from the user.

Example #15

The system of any of Examples #7-#14 can feature the pump being a first pump. The system can further include a second pump, a filter, and a check valve. The second pump can be coupled to the tubing to pump the fluid through the tubing. The filter can be coupled to the tubing to filter the fluid. The check valve can be coupled to the tubing to limit a direction of a flow path in the tubing.

Example #16

A method can include providing a chemical for treating a fluid in a pool system or a spa system. The method can further include providing a disposable chemical container having an inner volume for housing the chemical. The method can further include providing a seal for sealing the chemical in the inner volume of the disposable chemical container. The seal can open in response to the disposable chemical container being positioned in a chemical injector coupled to the pool system or the spa system.

Example #17

The method of Example #16 can feature the seal being an integrated pump for injecting the chemical into the pool system or the spa system.

Example #18

The method of any of Examples #16-#17 can further include providing a sensor for monitoring an amount of the chemical in the inner area of the disposable chemical container. The method can further include providing a processing device for communicatively coupling to the sensor to determine the amount is below a threshold. The method can further include providing a communication circuit for communicatively coupling to the processing device for requesting a replacement disposable chemical container when the amount drops below the threshold.

Example #19

The method of any of Examples #16-#18 can further include providing a tubing for coupling to the pool system or the spa system to allow fluid from the pool system or the spa system to flow therethrough. The method can further include providing an injection pump for coupling to the tubing to form the chemical injector that can be coupled to the disposable chemical container.

Example #20

The method of Example #19 can further include providing a second pump for coupling to the tubing to pump the fluid through the tubing. The method can further include providing a filter for coupling to the tubing to filter the fluid. The method can further include providing a check valve for coupling to the tubing to limit a direction of a flow path in the tubing.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An assembly for a pool or spa system comprising:
    a housing;
    a disposable chemical container for fluidly sealing a chemical in an inner volume of the disposable chemical container, wherein the disposable chemical container is housed in the housing;
    a pump coupled to the disposable chemical container for injecting the chemical into a fluid flow of the pool or spa system;
    a sensor configured to measure an amount of the chemical in the disposable chemical container;
    a processing device communicatively coupled to the sensor and configured to determine if the amount is below a threshold; and
    a communication circuit communicatively coupled to the processing device and configured to request a replacement assembly when the amount is below the threshold.

2. The assembly of claim 1, wherein the chemical is sealed in the inner volume of the disposable chemical container prior to the pump coupling to the pool system or the spa system.

3. The assembly of claim 1, further comprising:
    a second processing device communicatively coupled to the pump for activating the pump to inject a second amount of the chemical based on a characteristic of the fluid flow; and
    a second sensor communicatively coupled to the second processing device for measuring the characteristic of the fluid flow.

4. The assembly of claim 3, wherein the second sensor is for measuring an acidity of fluid in the fluid flow, wherein the chemical is an acid for adjusting the acidity of the fluid, and wherein the pump is calibrated for dispensing the acid in a standardized dose to allow treatment of the fluid.

5. The assembly of claim 1, further comprising:
    a second processing device communicatively coupled to the pump for activating the pump to inject a second amount of the chemical based on an instruction from a user; and
    a second communication circuit communicatively coupleable to the second processing device for receiving the instruction from the user.

6. A system comprising:
    a tubing coupled to a pool or a spa for allowing a fluid in the pool or the spa to flow therethrough;
    a chemical injector coupled to the tubing comprising:
        a pump for injecting a chemical into the tubing; and a disposable chemical container coupleable to the pump, the disposable chemical container including a seal for retaining the chemical in an inner volume of the disposable chemical container, wherein the seal opens in response to the disposable chemical container being coupled to the pump to allow the chemical to be injected by the pump into the tubing;

a sensor configured to measure an amount of the chemical in the disposable chemical container;

a processing device communicatively coupled to the sensor and configured to determine if the amount is below a threshold; and a communication circuit communicatively coupled to the processing device and configured to request a replacement disposable chemical container when the amount is below the threshold.

7. The system of claim 6, wherein the chemical is sealed in the inner volume of the disposable chemical container prior to the disposable chemical container being coupled to the pump.

8. The system of claim 7, wherein the seal of the disposable chemical container is a valve for coupling to the pump and opening to create a passageway between the inner volume of the disposable chemical container and the pump.

9. The system of claim 7, wherein the seal of the disposable chemical container is opened by a member of the pump piercing the seal to create a passageway between the inner volume of the disposable chemical container and the pump.

10. The system of claim 6, further comprising:
a second processing device communicatively coupled to the pump for activating the pump to inject a second amount of the chemical based on a characteristic of a fluid flow; and
a second sensor communicatively coupled to the second processing device for measuring the characteristic of the fluid flow.

11. The system of claim 10, wherein the second sensor is for measuring an acidity of fluid in the fluid flow, wherein the chemical is an acid for adjusting the acidity of the fluid, and wherein the pump is calibrated for dispensing the acid in a standardized dose to allow treatment of the fluid.

12. The system of claim 6, further comprising:
a second processing device communicatively coupled to the pump for activating the pump to inject a second amount of the chemical based on an instruction from a user; and
a second communication circuit communicatively coupleable to the second processing device for receiving the instruction from the user.

13. The system of claim 6, wherein the pump is a first pump, the system further comprising:
a second pump coupled to the tubing for pumping the fluid through the tubing;
a filter coupled to the tubing for filtering the fluid; and
a check valve coupled to the tubing for limiting a direction of a flow path in the tubing.

14. A method comprising:
providing a chemical for treating a fluid in a pool system or a spa system;
providing a disposable chemical container having an inner volume for housing the chemical;
providing a seal for sealing the chemical in the inner volume of the disposable chemical container, wherein the seal opens in response to the disposable chemical container being positioned in a chemical injector coupled to the pool system or the spa system;
providing a sensor configured to monitor an amount of the chemical in the inner volume of the disposable chemical container;
providing a processing device configured to communicatively couple to the sensor to determine if the amount is below a threshold; and
providing a communication circuit configured to communicatively couple to the processing device to request a replacement disposable chemical container when the amount drops below the threshold.

15. The method of claim 14, wherein the seal is an integrated pump for injecting the chemical into the pool system or the spa system.

16. The method of claim 14, further comprising:
providing a tubing for coupling to the pool system or the spa system to allow fluid from the pool system or the spa system to flow therethrough; and
providing an injection pump for coupling to the tubing to form the chemical injector that is coupleable to the disposable chemical container.

17. The method of claim 16, the method further comprising:
providing a second pump for coupling to the tubing to pump the fluid through the tubing;
providing a filter for coupling to the tubing to filter the fluid; and
providing a check valve for coupling to the tubing to limit a direction of a flow path in the tubing.

* * * * *